United States Patent Office 3,702,664
Patented Nov. 14, 1972

3,702,664
SUGARCANE PLANTING MACHINE
Morris Clement, P.O. Box 31, Charenton, La. 70523
Filed Sept. 10, 1971, Ser. No. 179,470
Int. Cl. A01c 7/00
U.S. Cl. 221—185                    10 Claims

ABSTRACT OF THE DISCLOSURE

The present disclosure concerns an improved device for planting sugarcane stalks, and like elongated planting material, which is dropped singly or in small bundles in an end-to-end configuration. A mobile unit having a storage hopper is provided with first and second consecutive driving chains arranged to drive the cane under first and second guides. A gate is arranged between the guides and operated by the second guide so that the gate is closed when cane is present under the second guide thus allowing only predetermined amounts of cane to be dispensed by the second driving chain.

BACKGROUND OF THE INVENTION

The field of invention

The present invention relates to a device for planting sugarcane and more particularly to a device for uniformly distributing a load of sugarcane into furrows in a predetermined manner.

Description of the prior art

It is well-known that different varieties of sugarcane have different spacing nodes that bear buds or cane seed. Variances amongst the different soils and fertilizers and/or conditions of growth require that the cane be planted at different lengths or spacings. The percentage of germination from the buds planted must also be regulated in order to achieve the most favorable growing conditions for the best crop yield.

There have been a number of attempts to provide mechanical planters which would adequately plant cane with the proper spacing and overlapping group droppings of cane. However, these machines, which are typified by U.S. Pats. No. 3,404,808 to Boudreaux and No. 3,468,-441 to Longman, have proved to be expensive to produce and have not always provided the desired adjustability so that the various planting conditions mentioned above can be readily compensated.

SUMMARY OF THE INVENTION

It is therefore an object of the present invention to provide an improved sugarcane planting mechanism which may be readily and economically produced.

It is a further object of the present invention to provide an improved sugarcane planter which may be readily adjusted to compensate for various types of planting according to the planting conditions and type of cane being planted.

It is a further object of the present invention to provide a sugarcane planter which may be used for dropping either single or multiple rows of sugarcane per pass through the cane field.

The present invention is characterized by a mobile unit having a storage hopper and means to dispense the cane in measured bundles from at least one side of the unit to fall into furrows in an end-to-end arrangement. The device includes first and second drive means directed toward one lateral edge of the unit to drive the cane under first and second spaced guides. As the cane passes under and raises the second guide, the upward movement causes closure of a gate between the guides so that only a predetermined quantity of cane can be dropped from the unit at any time.

BRIEF DESCRIPTION OF THE DRAWINGS

The means for accomplishing the foregoing objects and other advantages, which will be apparent to those skilled in the art, are disclosed in the following specification with reference to the accompanying claims in which:

DESCRIPTION OF THE PREFERRED EMBODIMENT

Figure 1:
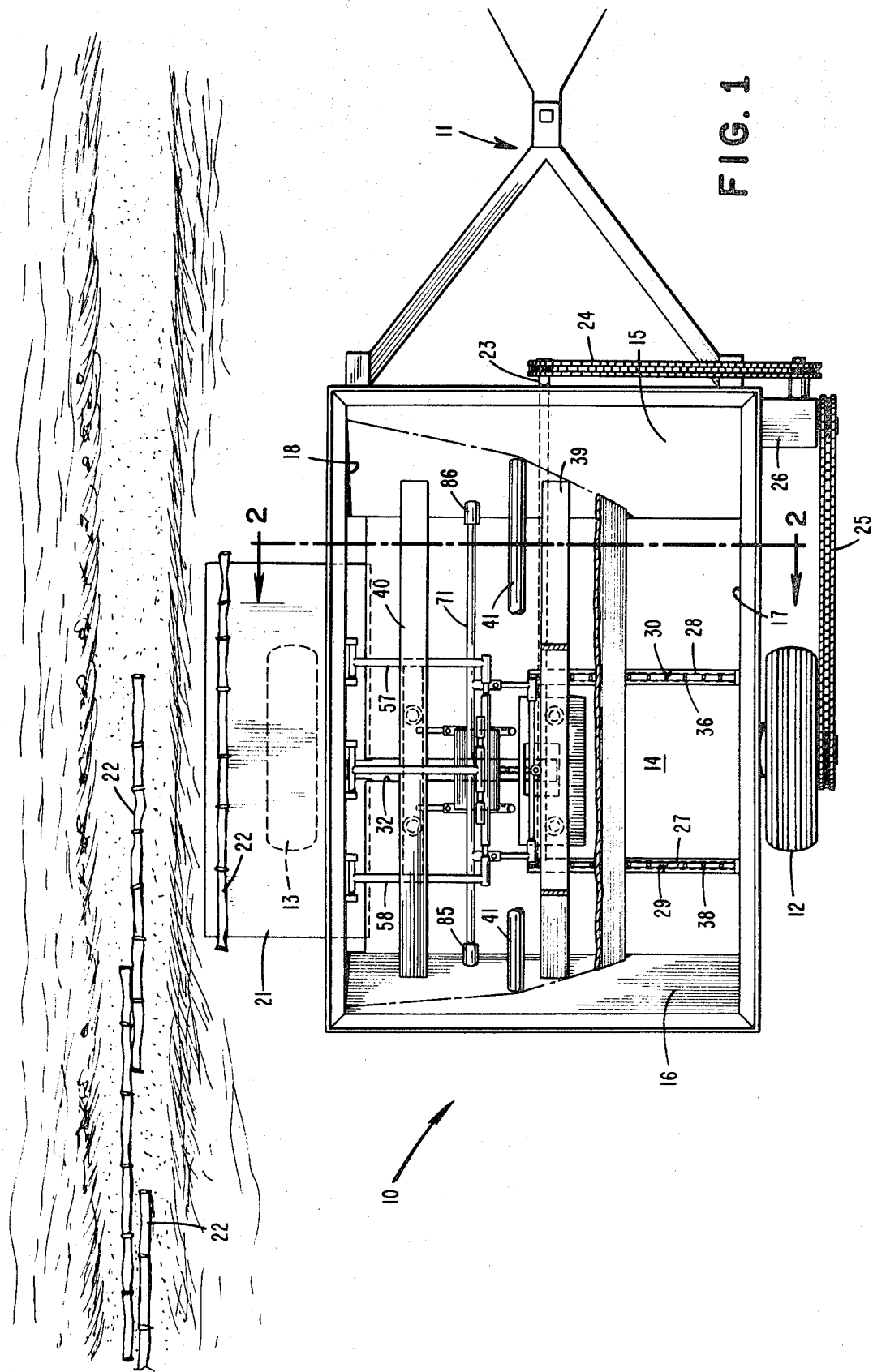
FIG. 1 is a top plan view of the planter with portions being broken away for clarity.

The inventive sugarcane planter is mounted on a mobile unit, here illustrated as a trailer 10 dispensing the cane from the left-hand side. The trailer is provided with hitching means 11, at least two wheels 12 and 13, a bottom deck 14, spaced front and rear walls 15 and 16 and spaced lateral walls 17 and 18. The walls generally define a hopper-like configuration with additional walls 19 and 20 forming a steep incline covering the operating components of the planter. A shelf-like projection 21 forms an extension of the bottom deck 14 and serves to prevent the cane 22 from falling into and fouling the wheel 13.

Driving power for the planter mechanism is provided by drive shaft 23 which may be driven from wheel 12 by conventional means, shown here as chains 24 and 25 and transmission 26. Gear reduction can be provided within the transmission 26 or by an additional unit, not shown, if it is deemed desirable.

A pair of spaced, parallel feed chains 27 and 28 are arranged to project through elongated openings 29 and 30, respectively, extending transversely through the bottom deck 14. A similar delivery chain 31 is arranged intermediate the feed chains to project through elongated opening 32. The chains 27, 28 and 31 are all driven from drive shaft 23 by means of drive sprockets, of which only sprocket 33 for feed chain 28 has been shown. The chains pass around outer sprockets, of which only sprockets 34 and 35 for chains 28 and 31, respectively, have been shown. The feed chains and delivery chain are preferably provided with a plurality of spaced dogs 36, 37 and 38, shown here as being at least partially resilient in order to avoid cutting into the cane while still transmitting adequate driving motion thereto.

The trailer is provided with at least three longitudinally extending frame members 39, 40 and 41 which are fixed generally parallel to one another and are spaced from both sides and the bottom of the trailer unit. A first guide shoe 42 depends from frame member 39 by spring 43 which biases the guide shoe downward to a position normally spaced above the bottom deck 14 of the trailer by a distance substantially equal to the average cane diameter. The shoe has an upward turned nose portion 44 and a flat bottom guide portion 45 which is maintained substantially parallel to the bottom deck 14. A slot 46 is also provided in the shoe for the passage therethrough of the gate 47.

A second guide shoe 48 is positioned spaced behind the first shoe 42. The second shoe is formed by spaced rails 49 and 50 each having an upwardly curved nose portion 51 and a flat guide portion 52 which includes an extensible arm 53 secured by bolt means 54. The second shoe is connected to a vertically extending arm 55. Parallel arm members 56, 57, and 58 are arranged with ends 59, 60 and 61 pivotally connected to the side 18 of the trailer and ends 62, 63 and 64 pivotally connected to the vertical arm 55. Spring 65 acts between the frame member 40 and a member 66 interconnecting the parallel arms 57 and 58 to bias the second guide shoe 48 in a downward direction to normally rest against the bottom deck 14 of the trailer.

A further linkage is connected to the second shoe 48 which comprises extension 67, linkage 68 and lever means 69. Lever means 69 comprises an arm 70 extending in one direction from shaft 71 and parallel arms 72 and 73 extending in the opposite direction from shaft 71. Shaft 71 is rotatably mounted in the trailer by bearings 85 and 86. Arms 72 and 73 each have extendible portions 76 and 77 secured by bolts 78 and 79, respectively, and pivotally connected to bar 87 of gate 47. Both the extension 67 and the lever arm 70 are provided with a series of holes so that their connection with linkage 68 may be adjusted.

The gate 49 comprises a vertical member 80 having an extendible portion 81 secured by bolt 82 and an abutment plate 83 on the lower end. A sleeve 84 fixed to frame member 39 receives the upper end of vertical member 80 and guides the vertical movement of the gate.

Frame member 41 serves to support the joint between walls 19 and 20 forming the hopper.

The present planter is designed to drop a certain number of cane stalks per group drop by adjusting the length of the lever means 69 by extending arm portions 76 and 77 and securing them by bolts 78 and 79. The length of overlap between group drops can be regulated by adjusting the length of the arms 53 on the second guide shoe 48. As the lever means 69 is lengthened, the gate plate 83 travels further from the bottom deck. This is corrected by readjusting the length of the vertical arm extension 81 of the gate as required. The leverage points are set back in order to make the device more compact and it is easily driven from the wheel of a trailer mounting the unit so that the cane will be delivered in a uniform manner regardless of the speed of the unit or the irregularities of the terrain.

In operation cane is fed to the hopper by a controlled carding drum or other mechanical or manual means, not shown. The first guide shoe 42 is normally biased to be spaced a given distance from the bottom of the card to enable only a single layer of the cane to be moved thereunder. The first guide shoe also serves to at least partially align the cane. The second shoe 48 is normally biased by the spring 65 against the bottom deck 14 of the trailer. In this position, shown in FIG. 2, the gate plate 83 is up allowing cane to pass therethrough as it is driven by the feed chains 27 and 28 to the delivery chain 31. Cane pushes against the nose portion of the second guide shoe and is drawn under by the delivery chain to lift the second guide shoe up against the biasing force of spring 65.

Figure 3:
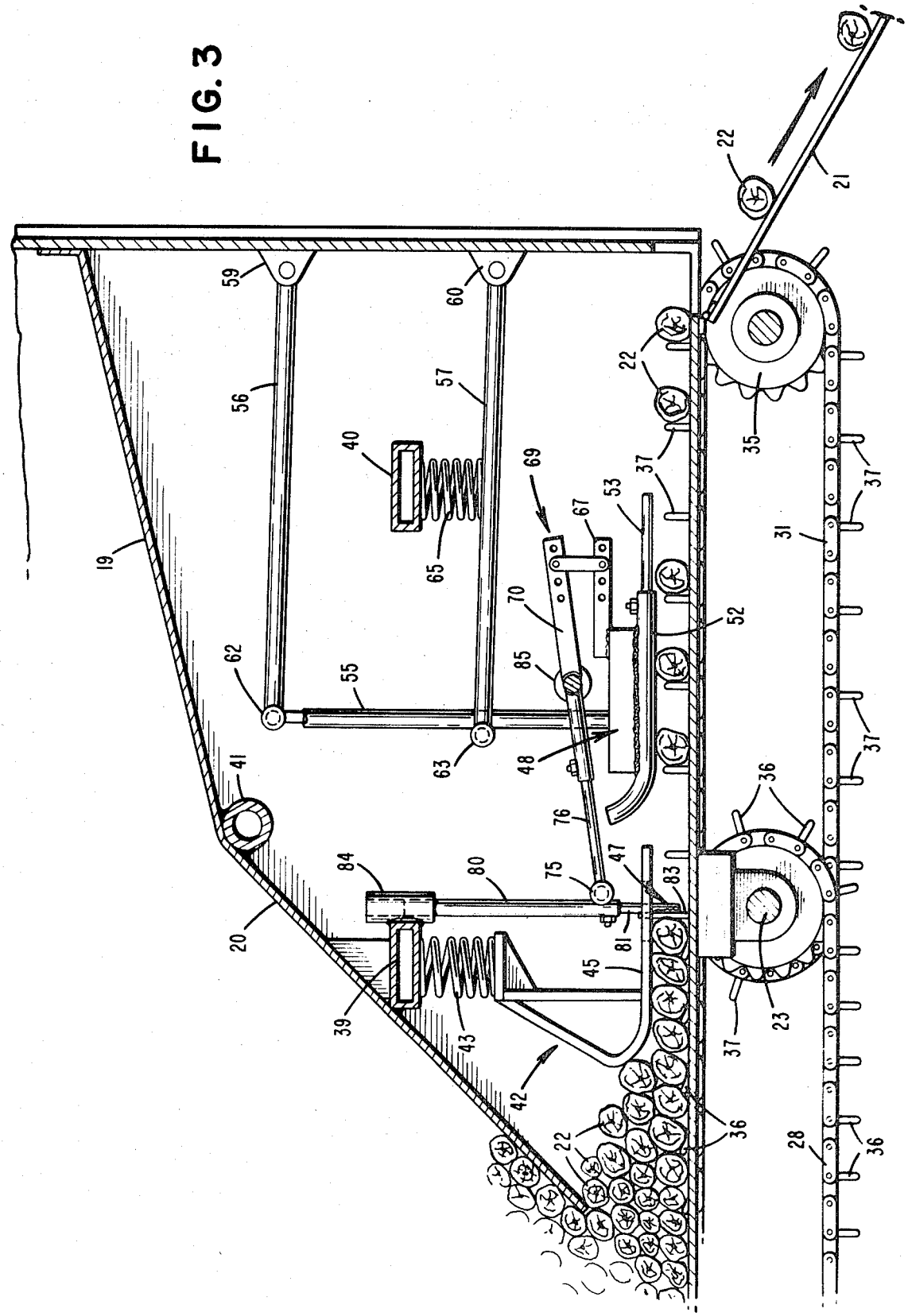
FIG. 3 is a view similar to FIG. 2 but on an enlarged scale showing one stage of operation of the planter.
Figure 4:
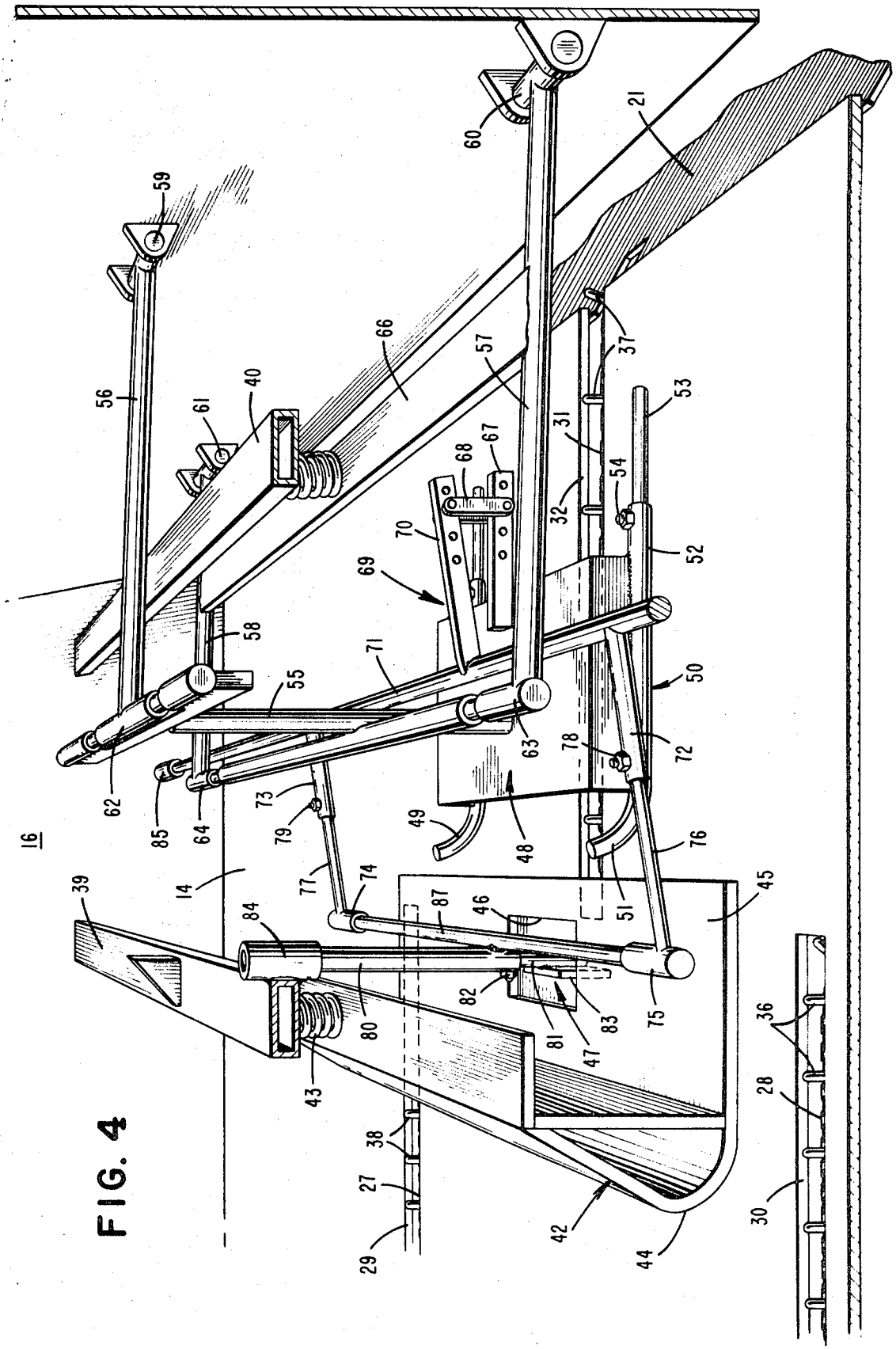
FIG. 4 is a perspective view of the device of the present invention.

As the second guide shoe is moved upwardly (as shown in FIG. 3) the extension 67, linkage 68, and lever means 69 will cause movement of the gate 47 in the downward direction so that the gate will extend at least to the bottom deck and stop the feed of cane. The at least partially resilient dogs on the feed chains will slide under the cane while feed is stopped by the closed gate. Cane under the second guide shoe keeps the gate closed until all of the group of cane under the second guide shoe has passed from under the extended arms of the second guide shoe.

Figure 2:
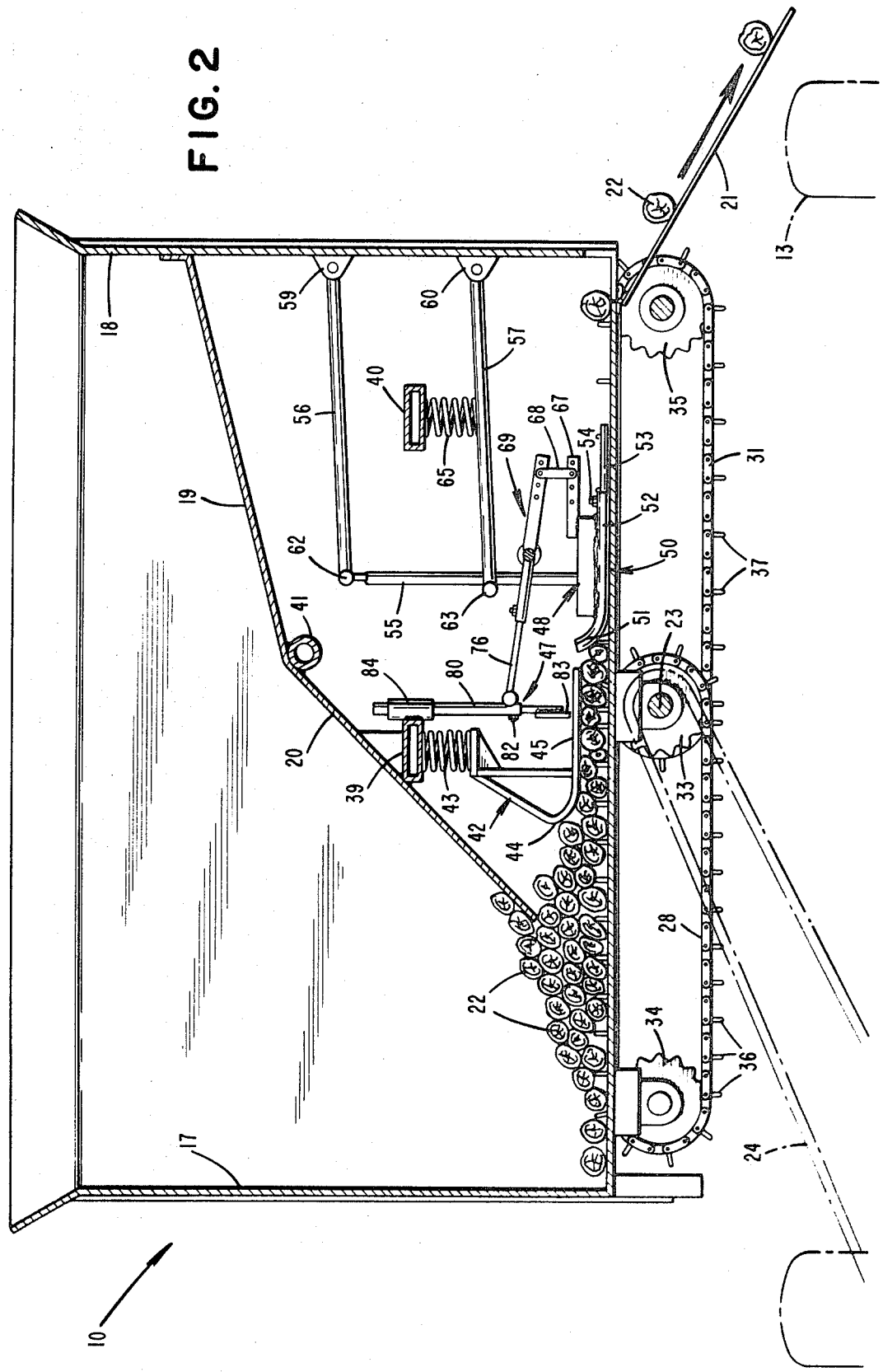
FIG. 2 is a transverse vertical section taken along line 2—2 of FIG. 1.

The spacing of the dogs on the delivery chain will help to determine whether or not the cane is dropped as a group or as overlapping individual stalk of cane. The cane will be delivered to the inclined plate 21 by the delivery chain and allowed to drop over the wheel 13 to a prepared trench, as shown in FIG. 1. After cane has cleared the extended arms 53, the second guide shoe will again drop to the bottom deck 14, as shown in FIG. 2, reopening gate 47 allowing the next bundle of cane to pass the delivery chain and to engage the second guide shoe.

The illustrated embodiment is intended as exemplary only. The present invention may be embodied in many other specific forms without departing from the spirit or essential characteristics thereof. For example, the invention may be installed in a cart, truck, or on other existing machinery and may be arranged to dispense single stalks or bundles of cane from either side or both sides simultaneously. The mobile unit may be self-propelled or pulled by a prime mover. Drive power may be supplied from the wheels of the unit or by separate driving means.

What is claimed is:

1. A device for planting sugar cane stalks and like elongated objects comprising
   a mobile unit having a bottom deck surface and hopper-like storage means extending upwardly therefrom,
   feed means and delivery means consecutively extending transversely of said bottom and substantially parallel to one another,
   first guide means adapted to align cane stalks in substantial parallel arrangement and no more than one deep on said bottom deck,
   said feed means extending beneath said first guide means,
   second guide means parallel to and spaced from said first guide means in the delivery direction,
   gate means operatively connected to said second guide means and located between said first and second guide means, said gate means being operated in such manner that said gate is open when said second guide means is in a down position and said gate is closed when said second guide means is in an up position, and
   means biasing said second guide means to a normal position,
   said second guide means being elevated against said biasing means by cane drawn thereunder by said delivery means whereby gate is closed and cane is delivered in groups to the side of the unit where it is allowed to drop by gravity into prepared furrows.

2. A device according to claim 1 further comprising spring means resiliently mounting said first guide means spaced from said bottom deck by a distance subsantially equal to the average diameter of surgarcane stalks.

3. A device according to claim 1 wherein each said guide means has a nose portion adapted to ride up on cane drawn against said guide means and an integral lower guiding surface extending substantially parallel to said bottom deck surface from said nose portion in the delivery direction.

4. A device according to claim 3 wherein the guiding surface of said second guide means further comprises arms adjustably extendible in said delivery direction and means to fix said arms.

5. A device according to claim 1 further comprising means to adjust the operative connection between said gate and said second guide means whereby the spacing between said gate and said second guide may be adjusted.

6. A device according to claim 1 further comprising means to adjust the vertical positioning of said gate with respect to said bottom deck whereby said gate will depend sufficiently towards said bottom deck in the closed position to prevent passage of cane therethrough.

7. A device according to claim 6 further comprising means to adjust the operative connection between said gate and said second guide means whereby the gate and second guide means can be adjusted for cane of different diameter.

8. A device according to claim 1 wherein said feed means and said delivery means comprises chains, further comprising means responsive to forward movement of said mobile unit operatively connected to drive said chains.

9. A device according to claim 8 further comprising dog teeth on said chains for engaging with and imparting motion to the cane.

10. A device according to claim 1 further comprising means forming an inclined extension of said bottom deck surface down which the cane drops clear of said mobile unit.

References Cited
UNITED STATES PATENTS

| | | | |
|---|---|---|---|
| 3,468,441 | 9/1969 | Longman | 111—2 X |
| 2,780,376 | 2/1957 | Sanders | 214—83.36 X |

ROBERT B. REEVES, Primary Examiner

T. E. KOCOVSKY, Assistant Examiner

U.S. Cl. X.R.

111—2; 214—519; 221—253